United States Patent
Lin et al.

(10) Patent No.: US 8,443,180 B2
(45) Date of Patent: May 14, 2013

(54) METHOD FOR OPERATION SYSTEM STARTUP

(75) Inventors: Hou-Yuan Lin, Taipei Hsien (TW); Chen-Shun Chen, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 448 days.

(21) Appl. No.: 12/509,464

(22) Filed: Jul. 25, 2009

(65) Prior Publication Data

US 2011/0022831 A1    Jan. 27, 2011

(51) Int. Cl.
*G06F 15/177*    (2006.01)
(52) U.S. Cl.
USPC .................................. 713/2; 713/1; 713/100

(58) Field of Classification Search ............... 713/1, 2, 713/100
See application file for complete search history.

(56) References Cited

U.S. PATENT DOCUMENTS

| | | | |
|---|---|---|---|
| 5,978,913 A | 11/1999 | Broyles et al. | |
| 6,434,696 B1 | 8/2002 | Kang | |
| 6,732,264 B1 * | 5/2004 | Sun et al. | 713/2 |
| 2005/0044348 A1 | 2/2005 | O'Connell | |
| 2009/0205052 A1 * | 8/2009 | Francfort et al. | 726/29 |
| 2010/0125723 A1 * | 5/2010 | Cooper et al. | 713/1 |

* cited by examiner

*Primary Examiner* — Thuan Du
(74) *Attorney, Agent, or Firm* — Chun-Ming Shih

(57) ABSTRACT

A method for operation system startup includes steps of switching on hardware startup; determining whether there is a trigger signal; reading an initial parameter from a storage device, and loading the initial parameter into a startup program when there is no trigger signal, executing the startup program; and entering operational system.

2 Claims, 2 Drawing Sheets

METHOD FOR OPERATION SYSTEM STARTUP

BACKGROUND

1. Field of the Invention

The present invention relates to a method for operation system startup.

2. Description of the Related Art

FIG. 1 is a flow chart of a conventional computer operation system startup. After a hardware startup and before entering the operation system, startup steps, such as system initialization, and loading an initial parameter to a startup program, are executed. Firstly, in step 102, when power supply and timing sequence of hardware, such as CPU or peripheral chips, is confirmed, the hardware startup is accomplished. Next, in step 104, system reads BIOS startup program, and executes system initialization, including system configuration analysis and hardware check, or user entering into BIOS to execute settings. Such as analyzing model number of CPU, size of memory and model number of hard disk, and checking whether there is a peripheral display, a keyboard, a hard disk, or etc., and executing basic settings. After accomplishing the foregoing steps, a set value of the system is changed, that is, a new initial parameter is generated. Hereafter, in step 106, the core of the system loads the initial parameter to the startup program, and finally, in step 108, entering operational system.

BRIEF SUMMARY

The present invention provides a method for operation system startup. The method includes steps of: switching on hardware startup; determining whether there is a trigger signal; reading an initial parameter from a storage device, and loading the initial parameter into a startup program when there is no trigger signal, executing the startup program; and entering operational system.

By means of conditionally simplifying startup steps, the method for operation system startup achieving an efficiency of decreasing a start time of the operation system.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
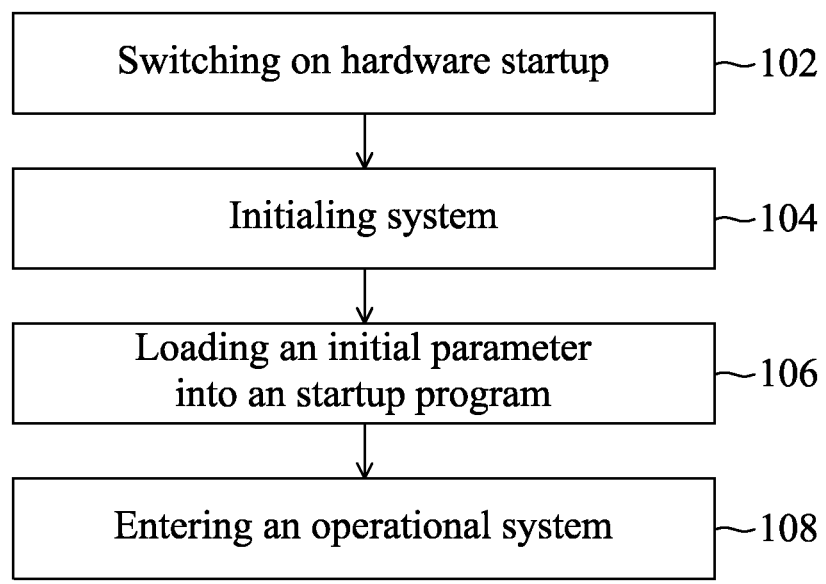
FIG. 1 is a flow chart of a conventional computer operation system startup.
Figure 2:
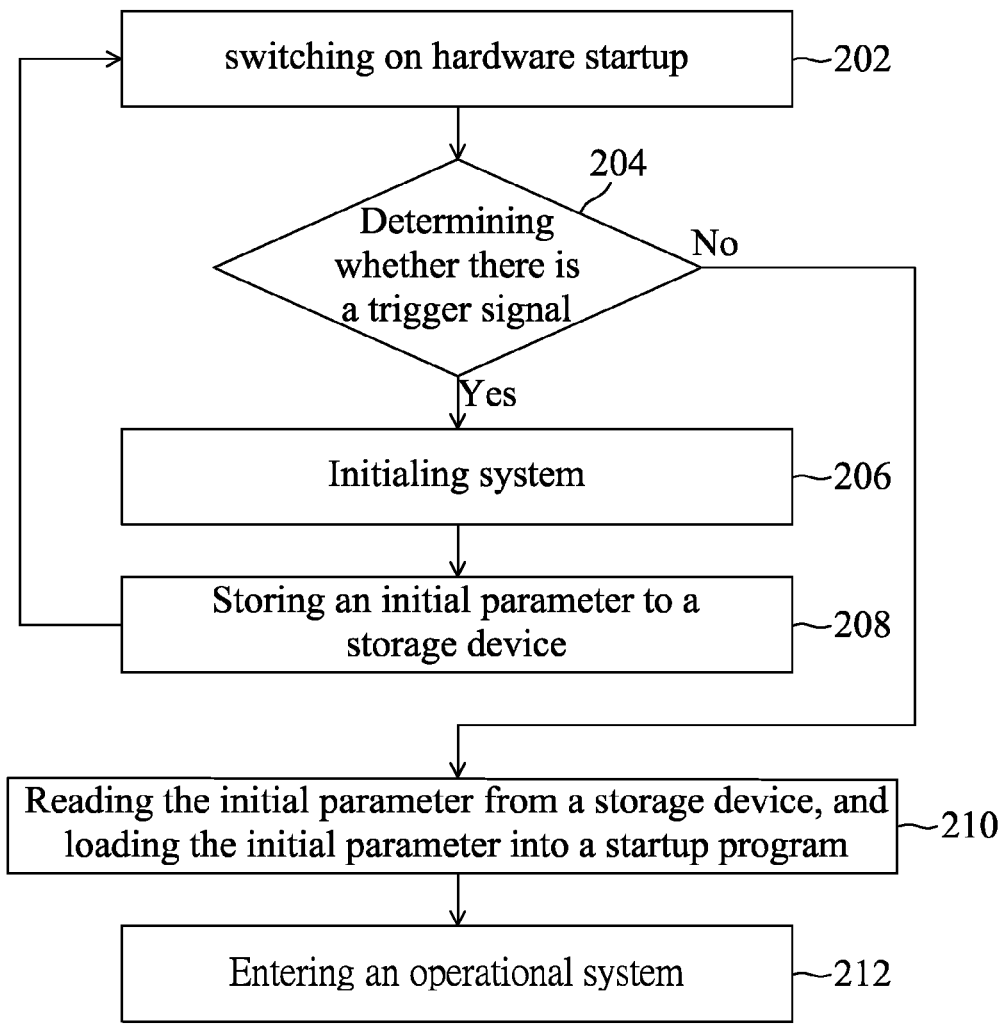
FIG. 2 is a flow chart of a method for operation system startup according to an embodiment of the present invention.

FIG. 2 is a flow chart of a method for operation system startup according to an embodiment of the present invention. Firstly starting from step 202, when a power supply is input into a computer, all of chip groups, including CPU, south and north bridges, and peripheral chips, need to wait for operation under a proper voltage and timing sequence. After accomplishing hardware startup, step 204 is executed, system will determine whether there is a trigger signal. Because both of newly introduced and replacement of a peripheral hardware may be monitored by a control chip, the trigger signal sent by the control chip can determine whether there is a hardware change. Moreover, the user can artificially set the trigger signal. In this embodiment, when the hardware is changed, the system will execute step 206, initializing the system, at the first time of startup. The step 206 includes analyzing model number of CPU, size of memory and model number of hard disk, checking a peripheral display, a keyboard, and the hard disk or etc., and executing basic settings, or user entering into BIOS to execute settings. By means of initialization, system generates a new initial parameter. Then, in step 208, system will store the initial parameter to a storage device, such as a hard disk, a cache memory, a storage chip, or etc., restart and return back to step 202.

When startup at a second time, the system will detect the trigger signal as a basis of whether to execute initialization. In a normal state, when there is no hardware change, the peripheral chips would not send the trigger signal, or when there is no artificial set trigger signal, steps 210-212 will be executed, and system reads the pre-stored initial parameter from the storage device, loads the initial parameter into a startup program and then enters operational system. Hereafter, when there is no trigger signal being detected, after startup at the second time, the system is no need to execute the steps of initialization and storing the initial parameter, and directly loads the pre-stored initial parameter to the startup program to accomplish startup process of the computer.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for operation system startup, comprising the steps:

switching on hardware startup;

determining whether a trigger signal is occurred due to artificial setting; and reading an initial parameter from a storage device, loading the initial parameter into a startup program, executing the startup program and entering operational system if no trigger signal is occurred, or executing system initialization, regenerating a new initial parameter, storing the new initial parameter to the storage device and restarting hardware startup if a trigger signal is occurred.

2. The method as claimed in claim 1, wherein the step of executing system initialization and regenerating a new initial parameter further comprises steps of:

analyzing model number of CPU, size of memory and model number of hard disk;

checking the existing hardware; and executing basic settings.

* * * * *